United States Patent
Takagi et al.

(10) Patent No.: US 6,504,919 B1
(45) Date of Patent: Jan. 7, 2003

(54) DATA TRANSMISSION APPARATUS AND DATA RECEPTION APPARATUS

(75) Inventors: Genzo Takagi, Ageo (JP); Yoshihiro Noguchi, Kawasaki (JP); Takashi Okiyama, Narashino (JP)

(73) Assignee: Matsushita Graphic Communication Systems, Inc., Tokyo (JP)

( * ) Notice: Subject to any disclaimer, the term of this patent is extended or adjusted under 35 U.S.C. 154(b) by 0 days.

(21) Appl. No.: 09/262,335

(22) Filed: Mar. 4, 1999

(30) Foreign Application Priority Data

Mar. 9, 1998 (JP) .......................................... 10-074979

(51) Int. Cl.⁷ .......................................... H04M 11/00
(52) U.S. Cl. .................... 379/100.17; 358/434
(58) Field of Search ................... 379/100.14, 100.17, 379/100.01, 93.31, 93.32, 93.34, 93.33; 358/434, 435, 438, 440

(56) References Cited

U.S. PATENT DOCUMENTS

| 4,910,506 A | * | 3/1990 | Yoshida et al. ............. 358/400 |
| 5,303,066 A | | 4/1994 | Kawaguchi |
| 5,907,599 A | * | 5/1999 | Sakayama et al. ..... 379/100.17 |
| 6,046,825 A | * | 4/2000 | Yoshida ....................... 358/434 |
| 6,075,620 A | * | 6/2000 | Yoshida et al. ............. 358/434 |
| 6,122,072 A | * | 9/2000 | Matsui et al. ............... 358/434 |

FOREIGN PATENT DOCUMENTS

| EP | 0507522 | 10/1992 |
| EP | 0878950 | 11/1998 |
| JP | 64-81469 | 3/1989 |
| JP | 5-75820 | 3/1993 |
| JP | 6-54156 | 2/1994 |
| JP | 8-88750 | 4/1996 |
| JP | 8-251370 | 9/1996 |
| JP | 9-186838 | 7/1997 |
| JP | 9-321905 | 12/1997 |

OTHER PUBLICATIONS

English Language Abstract of JP–8–88750.
English Language Abstract of JP–9–321905.
ITU–T Recommendation V.34 pp. 27, 38, 42, 43, and 55–65.
Patent Abstract of Japanese Patent Publication No. 06–054156, to Matsushita Electric Ind. Co. Ltd., published Feb. 25, 1994.
Patent Abstract of Japanese Patent Publication No. 05–075820, to RICOH Co. Ltd., published Mar. 26, 1993.
Patent Abstract of Japanese Patent Publication No. 01–081469, to NEC Corp., published Mar. 27, 1989.
English Language Abstract of JP 6–54156.
English Language Abstract of JP 5–75820.
English Language Abstract of JP 64–81469.

* cited by examiner

Primary Examiner—Stella Woo
(74) Attorney, Agent, or Firm—Greenblum & Bernstein, P.L.C.

(57) ABSTRACT

The data transmission apparatus comprises a memory to store control information of a modem at each destination address, and a communication control section for issuing a short procedure shift notification signal to execute the short communication procedure when the control information is stored at the memory, and issuing an ordinary communication initiation signal to execute the ordinary communication procedure when the control information is not stored at the memory.

11 Claims, 9 Drawing Sheets

**MEMORY AREA FOR EACH DESTINATION
REGISTERED FOR SHORT PROCEDURE**

| TELEPHONE NUMBER |
|---|
| INFOh |
| • POWER REDUCTION VALUE<br>• TRAINING LENGTH<br>• CARRIER SELECTION<br>• PREEMPHASIS FILTER SELECTION<br>• SYMBOL RATE SELECTION<br>• TRAINING CONSTELLATION POINT SELECTION |
| OPTIMAL TRAINING TIME |
| NON-LINEAR DISTORTION CORRECTION SELECTION |

DATA TRANSMISSION APPARATUS AND DATA RECEPTION APPARATUS

FIELD OF THE INVENTION

The present invention relates to a data transmission apparatus and data reception apparatus operating according to a communication protocol specified by ITU Recommendation V.34.

BACKGROUND ART

Recently, this type of data communication apparatus has performed data communications using a V.34 modem (28.8 kbps) which is specified by the ITU-T. For example, in a facsimile apparatus, the ITU-T also recommends T30ANEXF (so-called Super G3) as facsimile communication standards using the above V.34 modem for facsimile machines. An image data communication is carried out according to the communication standard (T30ANEXF).

Figure 1:
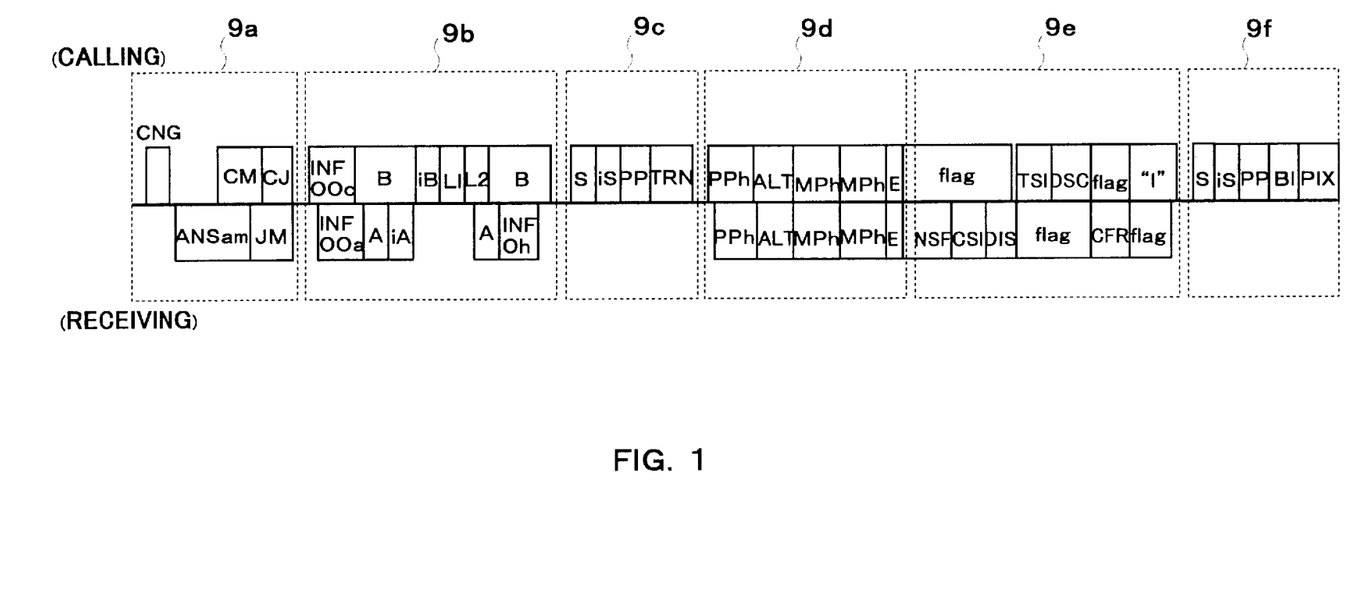
FIG. 1 is a communication sequence diagram of a conventional data communication apparatus.

A communication procedure in accordance with the communication standard will be explained based on the sequence chart illustrated in FIG. 1. FIG. 1 is a control signal chart for a procedure for facsimile communication according to the prior art.

In FIG. 1. 13, $9a$ is a communication procedure for selecting a modulation mode from among a V34 half duplex, V34 full duplex, V17 half duplex, etc. $9b$ is a communication procedure for implementing line probing to inspect a line and determine various kinds of parameters. $9c$ is a communication procedure for modem training. $9d$ is a communication procedure for setting a modem parameter. $9e$ is a communication procedure for exchanging a facsimile control signal. $9f$ is a data communication procedure for the primary channel. The upper side in the diagram is a sequence at a calling side, and the lower side is a sequence at a receiving side, and the sequences progress from left to right.

The above communication procedures will be discussed specifically.

First, after a line connection is established, in the communication procedure $9a$ for selecting a modulation mode, a modulation mode and communication protocol for enabling a communication between a calling side and a receiving side with a V.21 modem (300 bps, full duplex) are selected. A facsimile apparatus using a V.34 modem selects a V.34 communication as the modulation mode and facsimile communication as a communication protocol.

Then, in the communication procedure $9b$ for line probing, a line inspection is performed by a line probing tone that is transmitted from the calling side and received at the receiving side, and a training parameter is selected based on the result of the line inspection.

In the communication procedure $9c$ for modem training, the calling side transmits training signals based on the training parameter selected under the line probing communication procedure $9b$, while the receiving side receives the training signals, learns a filter coefficient of an adaptive equalizer for correcting the line characteristic and inspects the reception quality of the training signals.

In the communication procedure $9d$ for selecting a modem parameter, modem parameters are negotiated between the calling side and receiving side in full duplex communication at 1200 bps, and an optimal modem parameter is selected using the modem parameters preset in the apparatus, the result of the line inspection and the inspection of the reception quality of the training signals.

In the communication protocol $9e$ for a facsimile control signal, facsimile control signals NSF, CSI, DIS, TSI, DCS, CFR, etc. are negotiated in full duplex communication at 1200 bps.

In the data communication procedure $9f$, the calling side transmits image data and the receiving side receives the image data, in half duplex communication at 2400 bps to 28.8 kbps. In the case of performing communication at the maximum communication rate of 28.8 kbps, image data can be communicated in approximately three seconds per a sheet of ordinary sized paper.

The aforementioned communication is performed according to the training parameter selected under the communication procedure $9b$ for communication line probing and the modem parameter selected under the communication procedure $9d$ for selection of a modem parameter. To correct the line characteristic, a modem at the receiving side executes communication using the filter coefficient that has been learned in the modem training $9b$. The series of communication procedure described above enables the optimal data communication according to the line quality.

The above-described prior art structure involves five channels of procedure until starting transmitting image data (hereinafter referred to as pre-procedure) after line is established, and thus requires about 7 seconds. By contrast, since it takes about 3 seconds to transmit a single sheet of image data at the maximum communication rate of 28.8 kbps, the procedure requires over 60% of the entire time of 11 seconds required for transmission of one sheet of an original including a procedure after transmitting the image data of about 1 second. It takes longer to spend for the procedure as the number of transmission/reception lines increases, thereby generating a wasteful time and communication cost.

SUMMARY OF THE INVENTION

Accordingly, it is an object of the present invention to provide a data communication apparatus capable of shortening the time for the procedure that spends a relatively long time for setting of various parameters and others by omitting a part of the procedure.

A data transmission apparatus according to the present invention comprises a memory to store control information of a modem for each destination, and a communication control section for executing a short communication procedure by issuing a short communication procedure shift notification signal when the control information is stored at the memory, while executing an ordinary communication procedure by issuing an ordinary communication procedure call signal when the control information is not stored at the memory.

According to the above constitution, when the control information of a modem at a destination address is stored at the memory, it is possible to instantly shift to the short procedure. Therefore it is not necessary to acquire a modem parameter or the like that is necessary for a communication every time during the communication procedure, and it is thereby possible to shorten a communication time.

In addition, in the ordinary procedure, a communication control procedure is performed in accordance with ITU Recommendation V.34, while in the short procedure, a signal pattern that is different from that of a flag sequence specified by Recommendation T.30 is used as the short communication procedure shift notification signal.

According to the above constitution, since a terminal at the receiving side can distinguish a notification signal indicative of shift to the short procedure definitely from other signal specified by ITU Recommendation, it is possible for the terminal to shift to the short procedure assuredly. Specifically, the short communication procedure shift notification signal is a signal of a repeated pattern of "0011".

In addition, the data transmission apparatus of the present invention executes short communication procedure registration processing by the ordinary communication procedure signal, and after the registration, executes the short communication procedure by issuing the short communication procedure shift notification signal.

According to the above constitution, since it is possible to register a modem parameter in the ordinary communication procedure, the modem parameter registration processing is efficiently executed without using a specific procedure in order to enable communications in the short communication procedure to be executed from the next time.

In addition, the data transmission apparatus of the present invention selects the G3 facsimile communication procedure or the V.34 communication procedure corresponding to the transmission data amount so as to communicate.

According to the above constitution, when the transmission data amount is small, it is possible to shorten a communication time by communicating according to the G3 communication procedure instead of the V.34 communication procedure.

In addition, the data reception apparatus of the present invention comprises a reception section for receiving information from the above data transmission apparatus, and notification section for notifying a calling side of control information on a modem acquired at the receiving side in the ordinary communication procedure.

According to the above constitution, the calling side collectively stores the modem parameter that is acquired at the receiving side then notified to the calling side so as not to store the modem parameter at the reception side, thereby enabling an easy management of the modem parameter and an efficient configuration because it is not necessary to store at the receiving side.

The modem parameter acquired at the receiving side represents training time or data concerning an attenuation amount at a predetermined frequency for a modulation data arrangement.

Further, the data are set by a NSF signal in order to enable the receiving side to readily acquire the modem parameter for the short communication procedure. The calling side acquires the modem parameter acquired at the receiving side to make a set with the modem parameter acquired at the calling side and relates the set to a telephone number to store at the memory in which a short dial or the like is stored. Accordingly, it is not necessary for the receiving side to comprise a memory to store the modem parameter, and it is thus possible for the calling side to collectively manage the modem parameter to store.

BRIEF DESCRIPTION OF DRAWINGS

The above and other objects and features of the invention will appear more fully hereinafter from a consideration of the following description taken in connection with the accompanying drawing wherein one example is illustrated by way of example.

DESCRIPTION OF THE PREFERRED EMBODIMENT

An embodiment of the present invention will be explained below with reference to the accompanying drawings.

Figure 2:
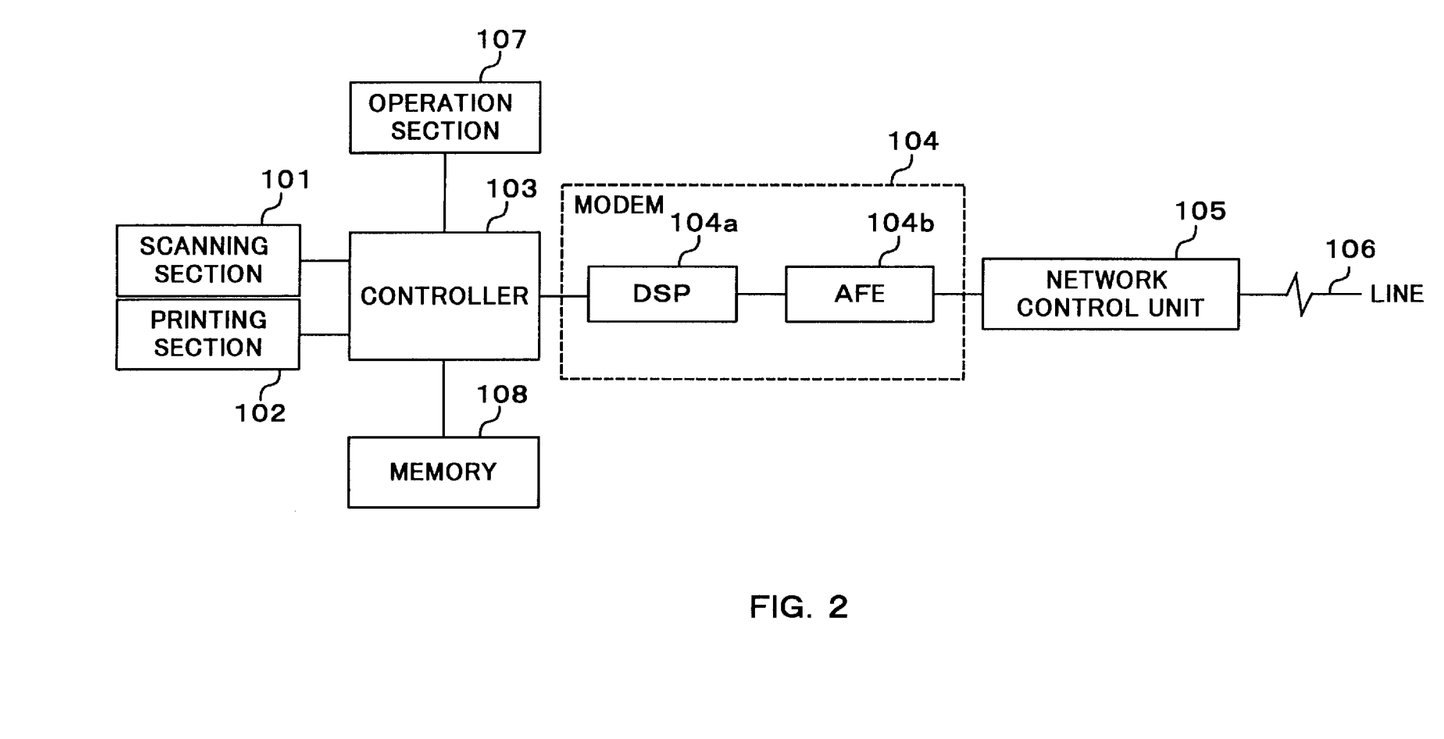
FIG. 2 is a block diagram of a data communication apparatus according to an embodiment of the present.

A data communication apparatus according to the embodiment of the present invention will be explained below referring to a facsimile apparatus as an example with reference to the accompanying drawings. FIG. 2 is a basic block diagram of the facsimile apparatus according to the embodiment of the present invention.

In FIG. 2, a scanning section 101 scans an original image, and a printing section 102 prints and outputs a received image. A controller 103 performs the control of the entire apparatus including the controls of coding and decoding of image signals and execution of a communication protocol.

A modem 104, which implements every modulation and demodulation in a facsimile communication procedure that is specified in T.30 ANEXF of the ITU-T, comprises a digital signal processor (DSP) 104a for performing modem's signal processing and an analog front end section (AFE) 104b having both A/D conversion and D/A conversion functions. A network control unit (NCU) 105 controls dialing and calling to a line 106.

An operation section 107 comprises various kinds of key input switches, such as dial keys and a start key, and a display unit for displaying information. Various sorts of operations of the apparatus are performed through this operation section 107.

A memory 108 is a memory to store various sorts of information on communication partners having a short communication procedure function. In this embodiment, information such as a telephone number and a modem parameter is stored. The stored modem parameters represent a power reduction value indicative of signal power, a time value indicative of a training time, carrier selection information to select either of high level or low level to set, preemphasis filter selection information, symbol rate selection information to select a rate among from five levels of rates for an eye pattern, training constellation point selection information, and shoulder gain information to adjust a data modulation timing.

Figure 3:
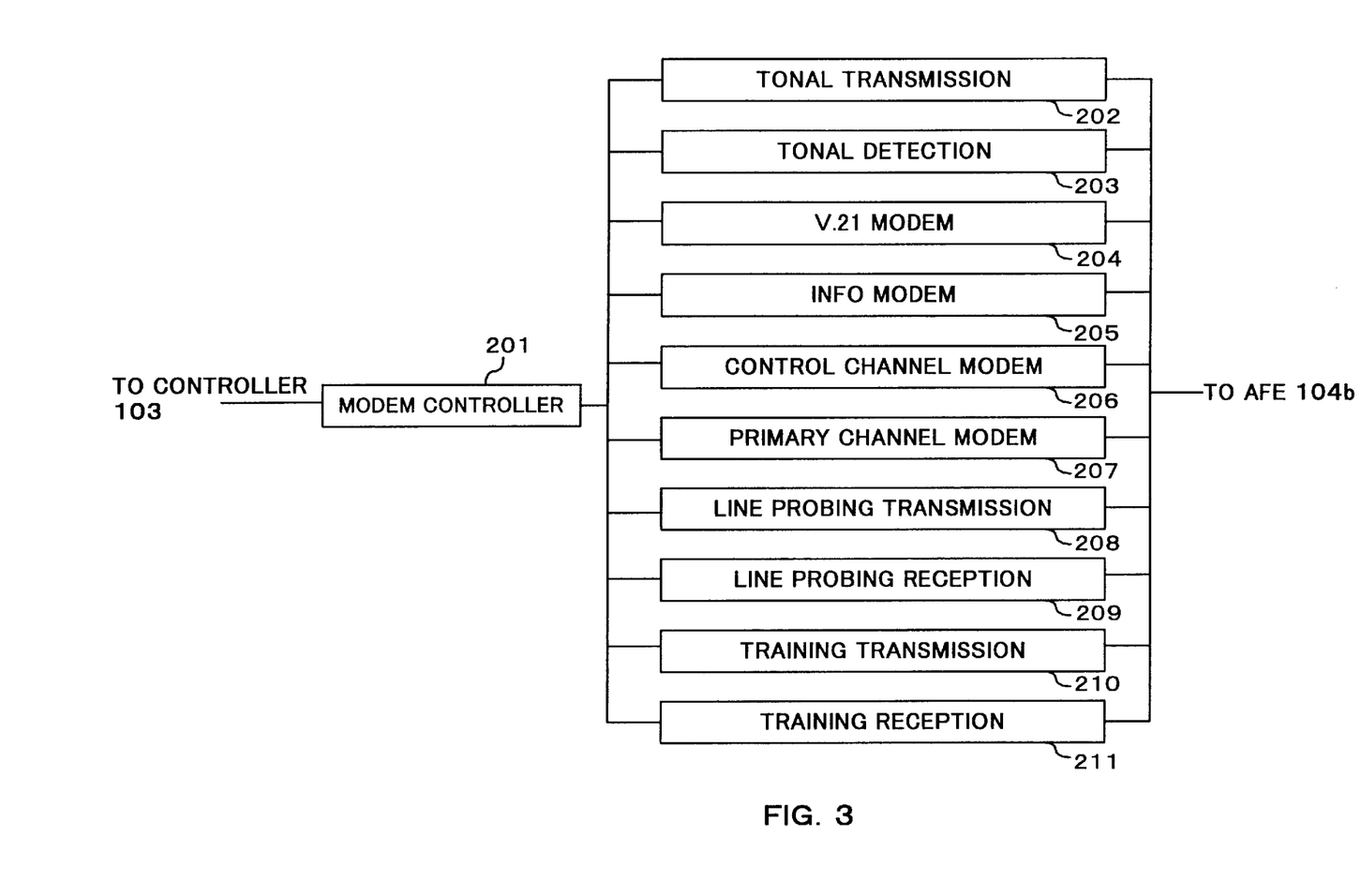
FIG. 3 is a functional block diagram of a modem section in the data communication apparatus according to the above embodiment.

The functional configuration of the digital signal processor (DSP) 104a of the modem 104 will be discussed with reference to FIG. 3.

A modem controller 201 controls interface with the controller 103 and various modem functions. This modem controller 201 has a plurality of functional sections which will be discussed below and which are executed by ordinary software.

A tonal transmission functional section 202 transmits various tonal signals corresponding to a communication procedure. A tonal detection functional section 203 identifies a tonal signal transmitted from a communication partner. A V.21 modem functional section 204 is a modem which conforms to ITU-T Recommendation V.21 (300 bps, full duplex). An INFO modem functional section 205 is a modem which conforms to ITU-T Recommendation V.34 (600 bps, full duplex) to perform a communication of an INFO sequence, and is used in a communication procedure for line probing and in a start procedure for a short procedure.

A control channel modem function section 206 is a control channel modem (1200 bps or 2300 bps, full duplex) specified by ITU-T Recommendation V.34, and is used in setting a modem parameter for a primary channel modem and in a communication procedure for a facsimile control signal.

A primary channel modem function section 207 is a primary channel modem (2400 bps to 33.6 kbps, half duplex) specified by ITU-T Recommendation V.34, and is used in communicating image data.

Figure 4:
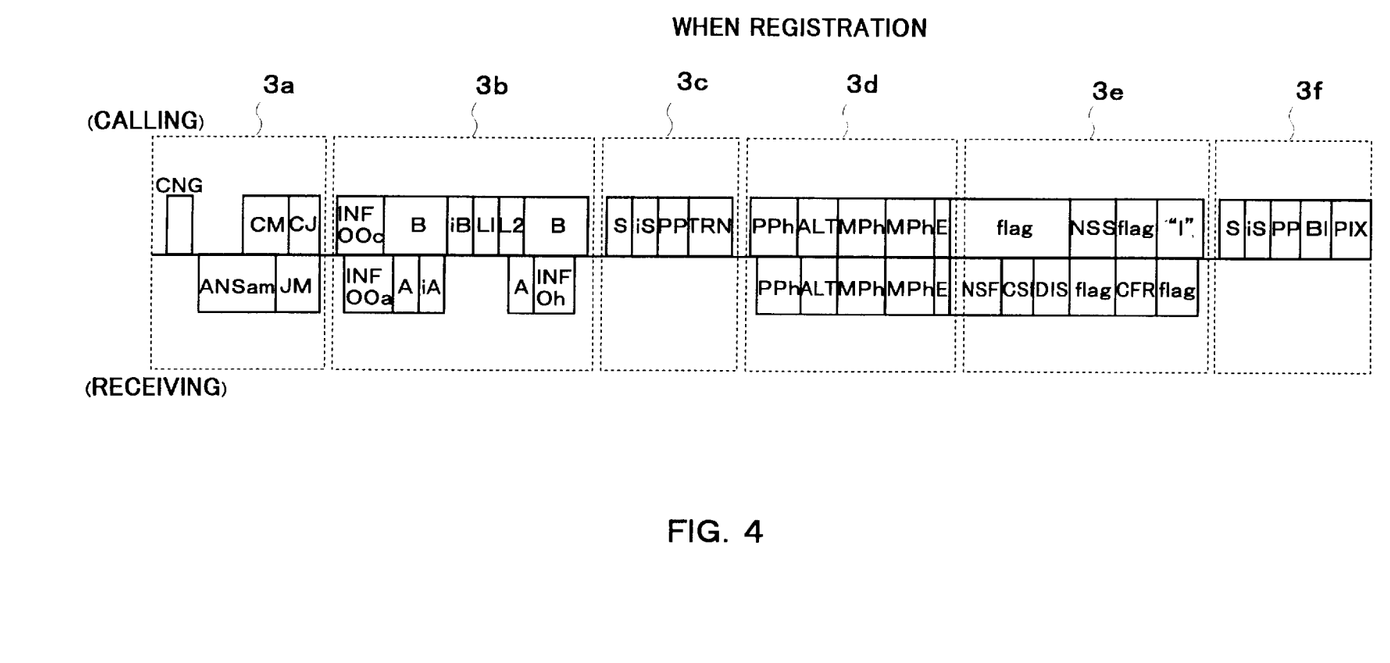
FIG. 4 is a communication sequence diagram when a short communication procedure is registered in the data communication apparatus according to the above embodiment.

A line probing transmission function section 208 transmits line probing tones which are specified by Recommendation V.34. The line probing tones are combined signals of 21 kinds of tonal signals of 150 Hz to 3750 Hz as shown in FIG. 4.

A line probing reception function section 209 receives the line probing tones from a communication partner to inspect the line. Specifically, the line probing reception function section 209 performs spectrum analysis of the received signals using the fast Fourier transform algorithm to select the optimal symbol rate, carrier frequency for the primary channel modem functional section 207, and other modem parameters.

A training transmission function section 210 transmits training signals for the V.34 modem, and a training reception function section 211 receives the training signals from the communication partner and learns a filter coefficient of an adaptive equalizer to correct a line distortion.

The processing of a short communication procedure registration of the present invention in the facsimile apparatus configured as described above will be explained with a sequence diagram in FIG. 4.

In FIG. 4, 3a is a communication procedure for selecting a modulation mode, 3b is a communication procedure for line probing, 3c is a communication procedure for modem training, 3d is a communication procedure for setting a modem parameter, 3e is a communication procedure for a facsimile control signal, and 3f is a data communication procedure 9f for transmitting image data.

The communication procedure 3a for selecting a modulation mode will be explained first. A calling side terminal transmits a calling station identification signal CNG, and a receiving side terminal transmits a modified answer tone ANSam corresponding to the CNG signal. Thereafter, the calling side terminal transmits a CM signal indicative of capabilities of modulation mode and communication protocol, while the receiving side terminal transmits a JM signal indicative of a common communication capability corresponding to the contents of the received CM signal. When this JM signal is confirmed, the calling side transmits a CJ signal and then shifts to the communication procedure 3b for line probing. The receiving side detects the CJ signal while transmitting the JM signal, and then also shifts to the communication procedure 9b for line probing. The signals CM, JM and CJ are communicated through the V.21 modem function section 204 (300 bps, full duplex).

Based on the exchange of those signals, a facsimile apparatus with a V.34 modem, for example, can select a modulation mode for the V.34 modem and a facsimile communication as a communication protocol.

Next, the communication procedure 3b for line probing will be explained. The calling side terminal transmits INFO0c indicative of a communication capability, such as the preset modulation rate and carrier frequency for the V.34 modem, and line probing tone signals L1 and L2. The receiving side terminal transmits INFO0a indicative of the preset communication capability, and receives the line probing tone signals.

The line probing tone signals are combined signals of 21 kinds of tonal signals of 150 Hz to 3750 Hz as shown in FIG. 4. The receiving side terminal receives the line probing tone signals, performs spectrum analysis of the received signals using the fast Fourier transform algorithm to select the optimal symbol rate and carrier frequency for the primary channel modem function section 207, and other modem parameters.

The receiving side terminal selects a communicatable training parameter from the selected contents and the contents of the INFO0c and INFO0a signals, and sets an INFO0h signal to transmit.

The aforementioned INFO0c, INFO0a and INFO0h signals are communicated through the INFO modem function section 205 (600 bps, full duplex). This communication procedure uses tones B and iB (having a phase of 180 degrees to the tone B) of the calling side, and tones A and iA (having a phase of 180 degrees to the tone A) of the receiving side, as response signals to acquire synchronization.

Next, the communication procedure 3c for modem training will be explained. The calling side terminal transmits training signals S, iS, PP and TRN using the training parameter of the aforementioned INFO0h signal. The receiving side terminal receives the training signals and learns the filter coefficient of the adaptive equalizer 402 to correct the line characteristic, while computes the optimal training time and noise power ratio SN in an equalization analyzing section 407.

Next, the communication procedure 3d for setting a modem parameter will be explained. The calling side terminal and the receiving side terminal transmit procedure sync signals PPh and ALT, and a modem parameter MPh associated with data communication respectively to the partner side, while transmit a confirmation to receive signal E for the MPh signal from the partner side, so that the calling side and the receiving side exchange the MPh signal.

The MPh signal of the calling side is a modem parameter preset in the calling side modem, while the MPh signal of the receiving side is a modem parameter selected from among a preset modem parameter, the line inspection result of the received line probing tones and the SN ratio computed from the received training signals. The communication procedure for setting the modem parameter is carried out using the control channel modem function section 206 (1200 bps, full duplex).

Next, the communication procedure 3*e* for a facsimile control signal will be explained. First, the receiving side terminal transmits a non-standard procedure signal NSF, a called station identification signal CSI, and a digital identification signal DIS. The receiving side terminal sets a flag indicating that it has a short procedure capability in the NSF field, and the optimal training time computed in the equalization analyzing section 407, so as to transmit.

On the other hand, after receiving the NSF, CSI and DIS signals and confirming that the receiving side terminal has a short procedure capability, the calling side terminal transmits a transmitting station identification signal TSI and a digital command signal DSC. At that time, the calling side sets a short procedure registration flag and stores various communication parameters that are exchanged in the current communication procedure at the memory 108 in association with the destination's telephone number. After receiving the TSI and DCS, the receiving side terminal transmits a confirmation to receive signal CFR. When one of the calling side terminal and receiving side terminal does not have a short procedure capability in other cases than the above discussed ones, the calling side does not set the short procedure registration flag. In this case, a communication procedure for the above facsimile control signal is executed using the control channel modem function section 206 (1200 bps, full duplex).

Next, the data communication procedure 3*d* for the primary channel will be explained. The communication in the procedure 3*e* is performed using a modem parameter, which is determined corresponding to the training parameter of the INFO0*h* signal and the MPh that satisfies both the calling side and the receiving side.

The calling side transmits procedure sync signals S, iS, PP and B1 for the primary channel, and then transmits PIX (image data). The receiving side receives the procedure sync signals S, iS, PP and B1 followed by the PIX (image data).

The communication at this stage is performed with the primary channel modem function section 207 (1200 bps to 28.8 kbps, half duplex), and particularly, a reception by the primary channel modem function section 207 of the receiving side is designed to correct a line distortion using the learned filter coefficient in the adaptive equalizer 402. In the case of communicating at the maximum communication rate of 28.8 kbps over the primary channel, the communication can be done in about 3 seconds per a single sheet of ordinary sized paper.

As been apparent from the above, the communication procedure in registering the short procedure is performed in the normal procedure as recommended by the T.30 ANEXF of the ITU-T. As a short procedure is registered in the memory 108 of the calling side, it is possible to communicate using the registered short procedure from the next time.

A communication procedure in the case of performing a registered short procedure will be explained with reference to a sequence diagram in FIG. 5.

Figure 5:
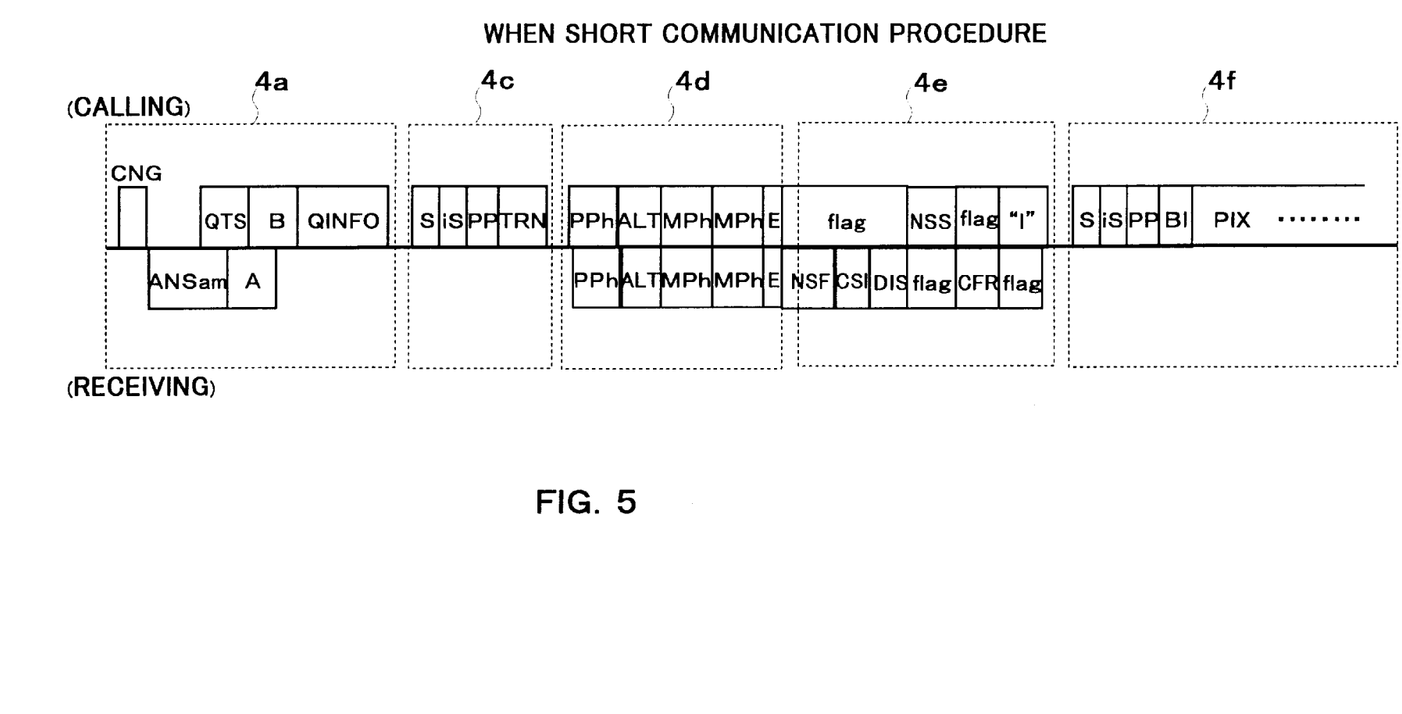
FIG. 5 is a communication sequence diagram when the short communication procedure is executed in the data communication apparatus according to the above embodiment.

In FIG. 5, 4*a* is a communication procedure for initiating a short procedure, 4*c* is a communication procedure for modem training, 4*d* is a communication procedure for setting a modem parameter, 4*e* is a communication procedure for a facsimile control signal, and 4*f* is a data communication procedure.

The communication procedure 4*a* for initiating the short procedure will be explained first. A calling side terminal transmits a calling station number identification signal CNG, and a receiving side terminal transmits a modified answer tone signal ANSam. After detecting this modified answer tone signal ANSam, the calling side terminal transmits a quick tonal signal QTS, and transmits tones B and QINFO upon detection of a response signal tone A from the receiving side. After detecting the quick tonal signal QTS from the calling side terminal, the receiving side terminal transmits the tone A and receives the QINFO from the calling side terminal.

This quick tonal signal QTS is a signal to instruct a shift to the short procedure. The quick tonal signal QTS is a repetitive pattern of "001100110011...". Such a tonal signal pattern is used in order to enable a receiving side terminal to definitely distinguish the received quick tonal signal QTS from a signal pattern of the flag sequence ("011110") and the tonal signal pattern of the call menu signal CM (2-bit start bits "10," 8-bit data and stop bit of "1") that are defined by ITU-T Recommendation T.30. Moreover, as the quick tonal signal QTS has the same modulation system as the call menu signal CM, the receiving side terminal can easily recognize whether the communication is to be performed in the short procedure or the normal procedure, depending on whether the incoming tonal signal is the quick tonal signal QTS or the call menu signal CM.

The QINFO signal is used to set the training parameter (INFO0*h*), the optimal training time and the non-linear distortion correction in registering the short procedure according to the content for each communication partner pre-registered at the memory 108, and a communication is performed with the V.21 modem function section 205 (300 bps, full duplex).

In the next communication procedure 4*c* for modem training, a communication is performed with the training parameter (INFO0*h*) of the QINFO signal and the optimal training time.

In the communication procedure 4*d* for setting a modem parameter, the MPH for the receiving side is set by selecting the QINFO-based non-linear distortion correction and information on the SN ratio computed in the communication procedure 4*c* for modem training.

In a communication procedure in the short procedure, only the communication procedure for initiating the short procedure is executed in an exclusive procedure, thereby shortening the communication procedure. Since the communication procedure for modem training and the subsequent communication procedures are performed in accordance with ITU-T Recommendation T.30 ANEXF, a communication time is the same as the ordinary communication.

Figure 6:
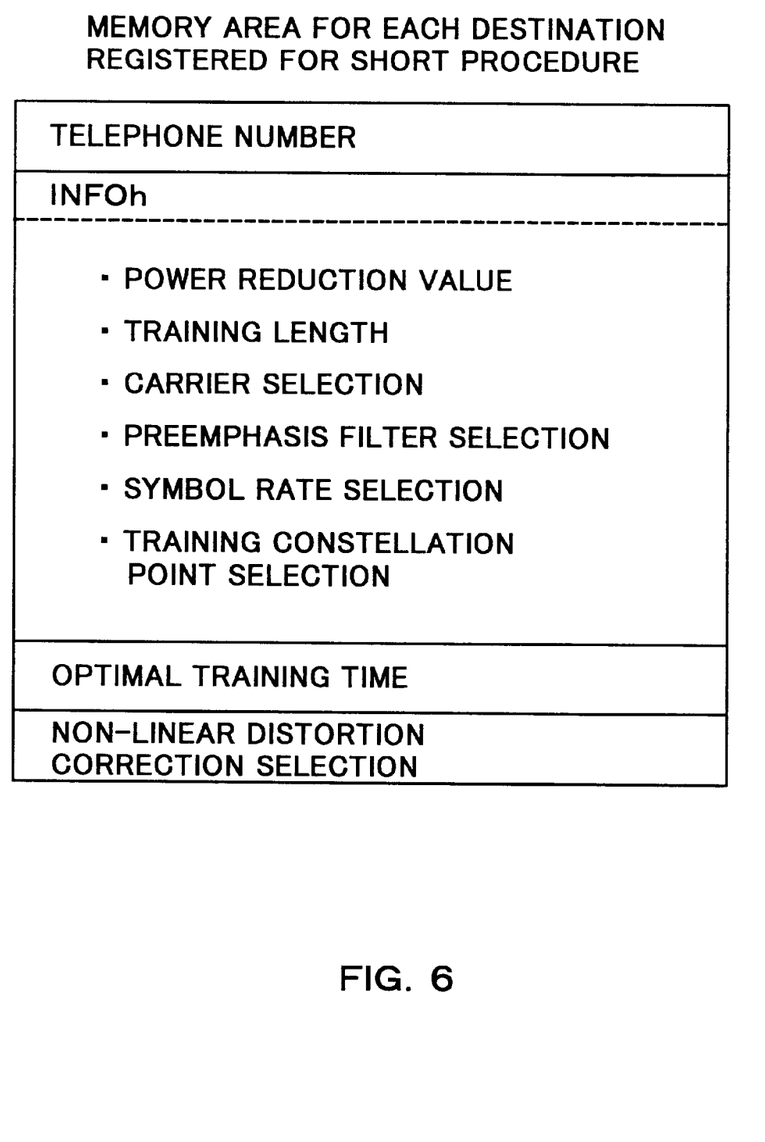
FIG. 6 is a memory area schematic diagram of the data communication apparatus according to the above embodiment.

In addition, in this embodiment, the memory 108 is configured as illustrated in FIG. 6 to register each modem parameter in association with a destination telephone number. It is also preferable to register the destination telephone number and modem parameter in association with a short dial key and redial key on the operation section 107 in order to facilitate a memory management such as a search of short procedure register memory.

Figure 7:
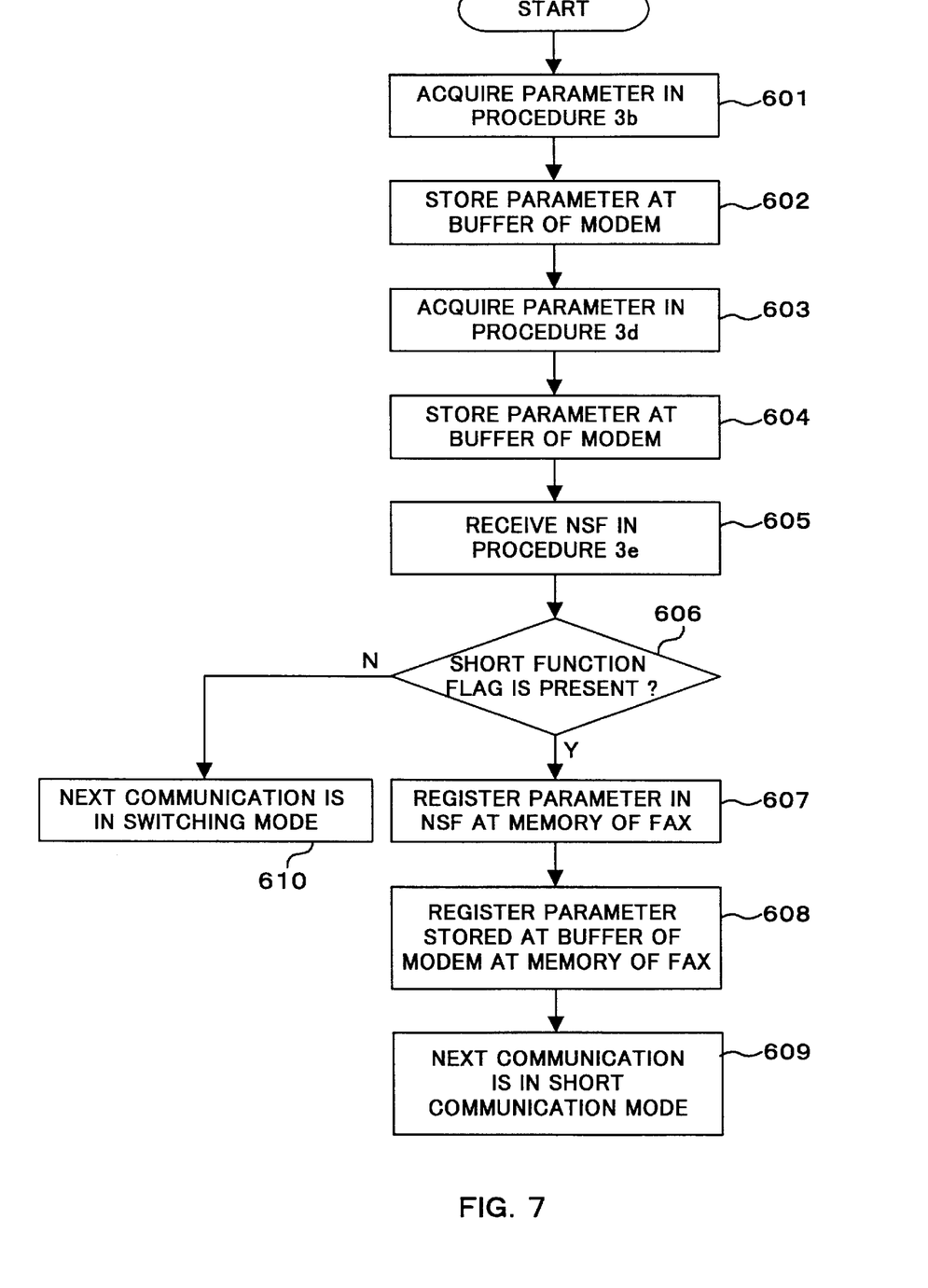
FIG. 7 is a flow diagram when the short communication procedure is registered in the data communication apparatus according to the above embodiment.

A procedure to register various kinds of modem parameters at the memory 108 will be explained next with reference to a flow diagram illustrated in FIG. 7.

As described above, in the procedure 3*b*, the receiving side terminal transmits modem parameter 1 (optimal symbol rate, carrier and training parameter) selected at the receiving side using the received line probing tone to the calling side terminal (INFOh). The calling side terminal acquires the modem parameter 1 from the INFO0 signal (ST601) to temporarily store at a buffer memory of a modem at the calling side terminal (ST602). Then, in the procedure 3d, the receiving side terminal exchanges the modem parameter MPh with the calling side and acquires parameters (including transfer rate and selection correction value to correct non-linear distortion) determined based on the training from the receiving side terminal (ST603) to temporarily store at the buffer memory of the modem at the calling side terminal (ST604).

Next, in the procedure 3e, the calling side terminal receives the NSF signal from the receiving side terminal (ST605). The NSF signal transmitted from the receiving side terminal includes a short function flag, optimal training time, and shoulder gain information. In other words, the receiving side terminal sets the short function flag, the optimal training time, and the shoulder gain information in the NSF signal.

The calling side terminal checks the short function flag included in the NSF signal received from the receiving side terminal (ST606). When the short function flag is present, the calling side terminal transfers the optimal training time and shoulder gain information along with the modem parameter stored at the buffer memory of the modem to a management memory of the calling side terminal, such as a facsimile apparatus, to store. On the contrary, when the short function flag is absence, the calling side terminal registers a switching mode at the memory 108 in order to select the G3 facsimile short communication procedure or the V.34 communication procedure to execute from the next time corresponding to the data amount (ST610).

The shoulder gain information is used in a data modulation and obtained from the equations (1) and (2) below, where fc is a carrier frequency and fs is a symbol rate.

$$fc-fs/2 \qquad (1)$$

$$fc+fs/2 \qquad (2)$$

Based on the above equations, a frequency used in an arrangement of modulation timing is computed corresponding to the line characteristic. The attenuation amount of each computed frequency is first obtained, and the shoulder information is obtained by multiplying one attenuation value by another one. The receiving side detects the attenuation amount of a predetermined frequency based on the information and arranges the modulation timing of data transmitted from the calling side based on the attenuation amount. However the shoulder information and training time are the information used at the receiving side, according to the present invention, the calling side stores the information and the receiving side receives the stored information every time when a communication is initiated from the calling side. It is thus possible to easily manage a communication with a partner side.

In other words, since the receiving side does not recognize a communication partner when the short communication initiates, it is convenient for the calling side to store the information. Further, according to an advantage of storing at the calling side, the storage is performed easily in association with a telephone number using a one-touch key or the like. On the contrary, if the receiving side should store the information, it will be result in a complicated configuration of the apparatus at the receiving side, for example, a memory will be newly prepared.

Figure 8:
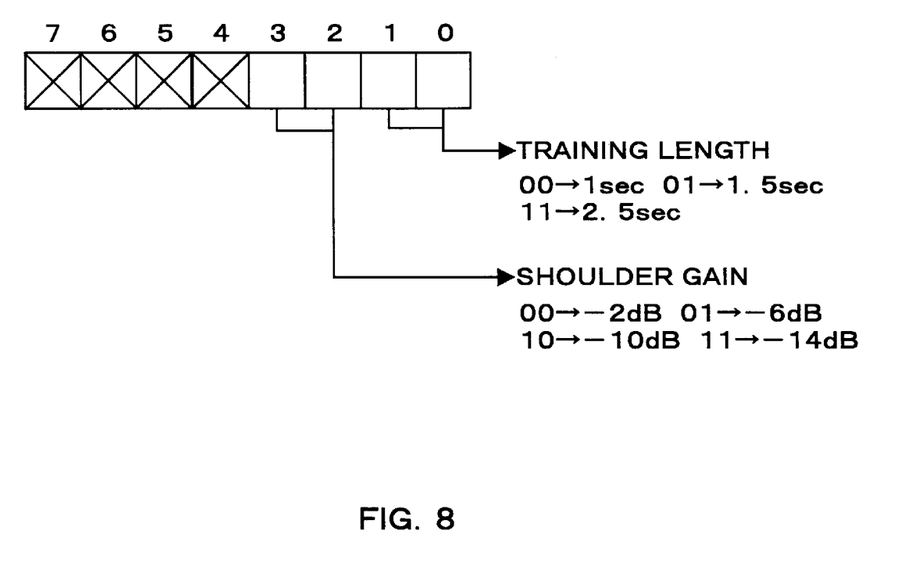
FIG. 8 is a frame configuration diagram of a NSF signal in the data communication apparatus according to the above embodiment.

In addition, the NSF signal has a frame configuration illustrated in FIG. 8. As illustrated, four LSB bits that a section of the NSF signal are assigned to two bits indicative of a training length and another two bits indicative of the shoulder gain information. According to these bit patterns, the optimal training length and a correction amount for the demodulation are set. Two of two bits are assigned to set with four patterns in FIG. 8, however it is also preferable to enable more settings within the bit number of the NSF signal.

In addition, the registration of parameters for the short procedure is executed with respect to a destination terminal that is already registered in the one-touch registration. When the short procedure is executed to a terminal whose telephone number is input from a ten-key or the like, it is necessary to reserve an area at the memory to store the telephone number associated with the modem parameter. In such case, the registration is performed until the memory areas are full. When the memory areas are full, a number registered in the short procedure is selected to rewrite. A number to be selected is determined corresponding to information such as a communication possibility and a date of the short procedure registration.

In addition, when the caller number notification service is used, since the receiving side recognizes a partner telephone number when the short procedure initiates, it may be possible to provide a configuration to store the partner telephone number, the training time and the shoulder information at the receiving side.

In addition, the above embodiment describes the modem with the buffer memory, however a modem with no buffer memory is also available. In this case, the modem parameter acquired from a partner terminal may be controlled to be transferred to the management memory in the facsimile apparatus. Specifically, it is necessary to transfer the INFOh signal obtained in the procedure 9b, then the MPh signal obtained in the procedure 9d, further the information in the NSF signal obtained in the procedure 9e to store in association with each other. When a partner does not have the short procedure, the received NSF signal is analyzed and the temporarily stored parameter is deleted from the memory.

Figure 9:
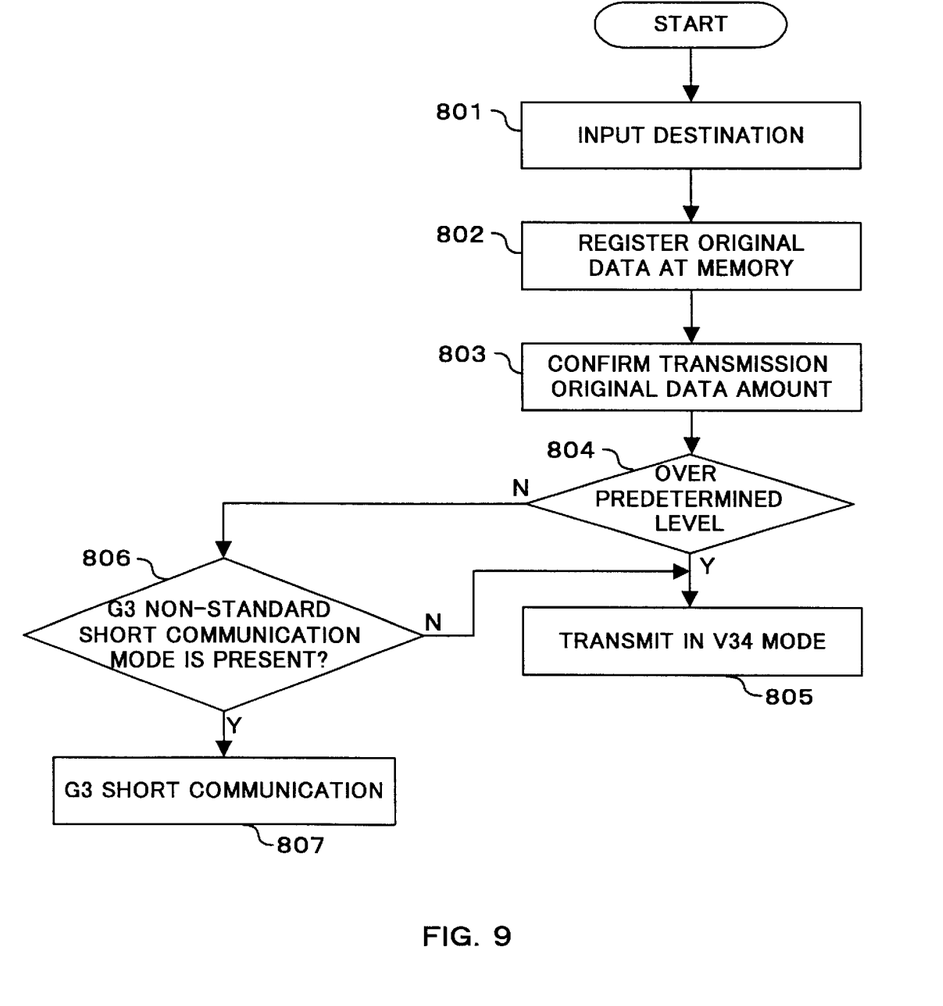
FIG. 9 is a flow diagram when a communication mode is switched in the data communication apparatus according to the above embodiment.

A procedure in the case of performing a communication determining. whether or not the short procedure is executed corresponding to a transmission original amount will be explained next with reference to the drawing. FIG. 9 illustrates a flow diagram to select the G3 short communication procedure or the V.34 communication procedure. The selection is performed because the V.34 short procedure introduces a longer total communication time when the transmission original amount is small.

In ST801 to ST803, a start button is pushed after a transmission original is set and a destination address is input, and the original is once stored at a memory for transmission to determine the data amount of the transmission original.

In ST804 to ST805, it is determined whether or not the data amount exceeds a predetermined level. When it exceeds the predetermined level, the communication is performed according to the V.34 communication procedure that is faster.

In ST806 to ST807, when the transmission amount is under the predetermined level, it is further determined whether or not a terminal at destination address supports the short procedure that is a G3 non-standard procedure. The determination is performed using a previous communication history. When the partner terminal supports the non-standard procedure and has the G3 short procedure, the communication is performed according to the G3 short procedure. It is because the execution of the V.34 communication procedure introduces a longer execution time when the data amount is small. On the other hand, when the partner terminal does not have the G3 short procedure, a communication is performed according to the V.34 communication procedure (ST805).

As been obvious from the above description, according to the present invention, it is possible to register the short procedure in the V.34 procedure efficiently and select whether to execute the V.34 short procedure corresponding to the capability of a partner terminal, thereby enabling a data communication to be always performed at the shortest communication time.

The present invention is not limited to the above described embodiments, and various variations and modifications may be possible without departing from the scope of the present.

This application is based on the Japanese Patent Application No. HEI 10-74979 filed on Mar. 9, 1998, entire content of which is expressly incorporated by reference herein.

What is claimed is:

1. A data transmission apparatus for determining modem control information in a procedure according to a communication protocol, comprising:

a modem configured to execute the procedure as an ordinary procedure and a short procedure;

a storage section that stores the modem control information for each destination apparatus; and a communication control section that instructs the modem of the data transmission apparatus to execute the short procedure when communication is performed with a destination apparatus, for which the modem control information is stored in the storage section wherein the modem of the data transmission apparatus transmits a shift notification signal indicative of a shift to the short procedure after transmitting a calling station identification signal to the destination apparatus, the shift notification signal including a signal pattern different from a signal pattern of a flag sequence specified by Recommendation T. 30, and wherein the shift notification signal includes a signal pattern of repetitions of "0011".

2. The data transmission apparatus according to claim 1, wherein, when communication is performed with a destination apparatus whose modem control information is not stored, the communication control section stores the modem control information of the destination apparatus into the storage section, the modem control information of the destination apparatus being determined in the ordinary procedure by the modem of the data communication apparatus.

3. The data transmission apparatus according to claim 2, wherein when the destination apparatus has a short procedure function, the communication control section stores the modem control information of the destination apparatus into the storage section.

4. The data transmission apparatus according to claim 3, wherein when flag data indicating that the short procedure function is valid is included in a non-standard procedure signal received from said destination apparatus, said communication control section determines that the destination apparatus has the short procedure function.

5. The data transmission apparatus according to claim 4, wherein the communication control section acquires at least an optimal training time and shoulder gain data from the non-standard procedure signal including the flag data to store into the storage section.

6. The data transmission apparatus according to claim 1 wherein the apparatus selects one of a G3 facsimile communication procedure and a V.34 communication procedure to communicate in accordance with a transmission data amount.

7. A data reception apparatus for determining modem control information in a procedure according to a communication protocol, comprising:

a receiving section that receives information from a data transmission apparatus according to claim 1; and a notification section that notifies the modem control information acquired at a receiving side in an ordinary procedure.

8. The data reception apparatus according to claim 7, wherein the modem control information includes at least one of a training time and data concerning an attenuation at a predetermined frequency used to adjust modulation data.

9. The data reception apparatus according to claim 7, wherein the data reception apparatus sets at least one of flag data indicating that a short procedure function is valid, the training time, and a correction signal, in a non-standard procedure signal.

10. A method of registering a short procedure in a data transmission apparatus, comprising:

transmitting a notification signal indicating a start of the short procedure, the notification signal including a signal pattern of repetitions of "0011";

notifying a receiving side of modem control information stored at a storage section when the short procedure is executed; and storing, when an ordinary procedure is performed, the modem control information acquired at a calling side into the storage section, and acquiring the modem control information acquired in the ordinary procedure at the receiving side to store in the storage section.

11. A method of registering a short communication procedure in a data reception apparatus, comprising:

receiving a notification signal indicating a start of a short communication procedure, the notification signal including a signal pattern of repetitions of "0011";

receiving modem control information stored in a storage section at a calling side and using the modem control information to execute a receiving control when the short communication procedure is executed; and generating, when an ordinary procedure is performed, the modem control information in the ordinary procedure and notifying the modem control information to the calling side in order to enable the storage section to store the modem control information.

* * * * *